Sept. 8, 1959     T. L. HANSON ET AL     2,903,165

DISPENSING TRAP HAVING FLEXIBLE WALLS

Filed May 13, 1957

INVENTORS.
Theodore L. Hanson
Donald W. McBride
BY
ATTORNEY.

United States Patent Office 2,903,165
Patented Sept. 8, 1959

2,903,165
DISPENSING TRAP HAVING FLEXIBLE WALLS

Theodore L. Hanson and Donald W. McBride, Kansas City, Mo., assignors to The Vendo Company, Kansas City, Mo., a corporation of Missouri Application May 13, 1957, Serial No. 658,834

4 Claims. (Cl. 222—447)

This invention relates to a metering device for dispensing a fixed amount of liquid, powder, or granular material during each cycle of operation of the device, as for example, in an automatic coffee machine wherein it is desired to dispense a measured amount of liquid cream into a cup of coffee.

It is the primary object of the instant invention to provide a metering device having positively acting structure for pinching a material conveying tube transversely thereof and including a pair of reciprocable slides, both of which shift a predetermined distance during each cycle of operation of the device, whereby the tube is fully opened at one point thereof and completely closed at another point thereon by the action of the slides themselves.

Another important object of the present invention is the provision of a metering device that has novel toggle joint means for actuating the slides which are adapted for operable interconnection so that the same may be actuated through the use of a single power drive.

A further object of the present invention is to provide a metering device including as a part of the operating structure thereof, a swingable crank capable of actuating both toggle joints as the crank is in turn caused to swing through use of a solenoid or other power means.

A still further object of the present invention is to provide an easily and quickly adjustable member between the slides for varying the size of the flexible tube and, therefore, the amount of material dispensed thereby.

An important feature of the instant invention includes also a specially formed channel member for releasably holding the flexible tube in place operably associated with the aforementioned slides and said member for adjusting the size of the tube.

Still another object of the present invention is to provide novel means for adjusting the strokes of the slides.

Figure 1:
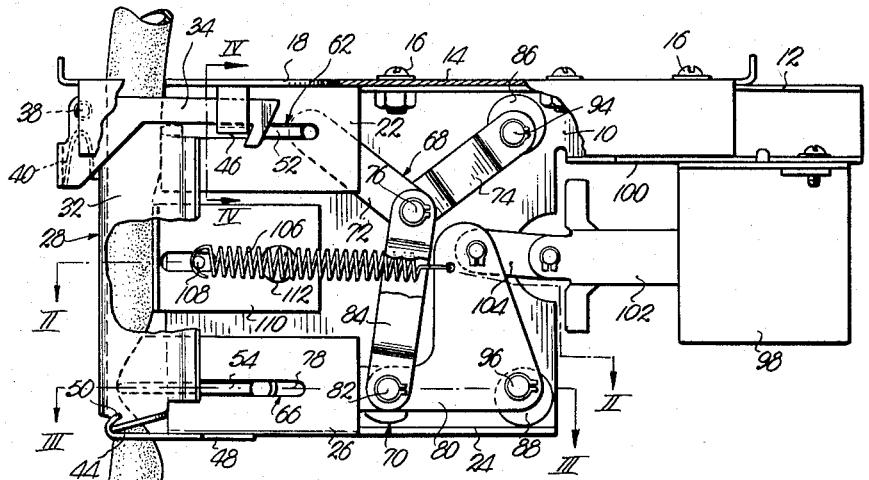
Figure 1 is a side elevational view of a dispensing trap having flexible walls made pursuant to the present invention, parts being broken away for clearness.
Figure 2:
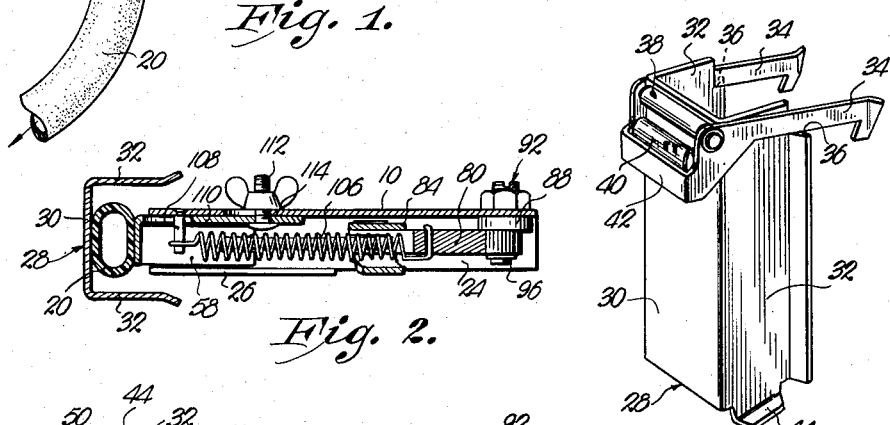
Fig. 2 is a cross-sectional view taken on irregular line II—II of Fig. 1.
Figure 5:
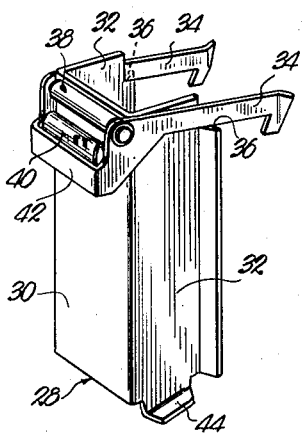
Fig. 5 is a perspective view of the channel element shown in Figs. 1–3 for holding the flexible tube in place.

A support for the component parts of the metering device illustrated in the drawing includes a vertical wall 10, having a lateral flange 12 at its uppermost edge which is in turn attached to a top wall 14 through the medium of a plurality of fasteners 16.

Wall 14 is provided with an opening 18 that clears a flexible tube 20 and the flange 12 is provided with a downturned plate 22 at one end thereof spaced from the wall 10. Similarly, a lateral flange 24 at the lower edge of wall 10, is provided with an upstanding plate 26 at one end thereof which is vertically aligned with the plate 22.

The tube 20 is releasably held in place by a U-shaped channel element broadly designated by the numeral 28, having a bight or backing plate 30 for the tube 20 and a pair of legs 32. The element 28 carries a pair of interconnected hooks 34 swingable toward and away from stops 36 by virtue of hinge means 38 serving to attach the hooks 34 to the bight 30 in embracing relationship to the element 28. A U-shaped leaf spring 40 interposed between bight 30 and crossbar 42 which joins hooks 34, yieldably biases the hooks 34 toward the stops 36. Outturned, inclined ears 44 are formed on the legs 32 adjacent the bottom of the latter.

The wall 14 is provided with a pair of ledges 46 therebeneath for receiving the hooks 34 and a U-shaped plate 48 secured to the bottom flange 24 has its legs provided with upturned hooks 50 which receive the ears 44.

Figure 3:
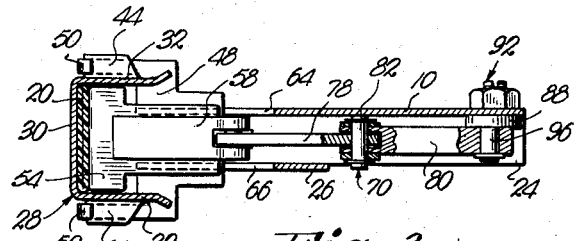
Fig. 3 is a cross-sectional view taken on line III—III of Fig. 1.
Figure 4:
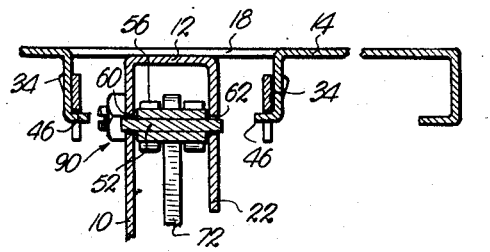
Fig. 4 is a fragmentary, vertical, cross-sectional view taken on line IV—IV of Fig. 1.

A pair of slides 52 and 54 of identical character are T-shaped as shown in Fig. 3 and have the stem portions thereof embraced by U-shaped hinge straps 56 and 58 respectively and rigidly secured thereto.

The upper slide 52 is carried by wall 10 and plate 22 through the medium of slots 60 and 62 respectively and slide 54 is carried in the same manner by wall 10 and panel 26 through the medium of slots 64 and 66 respectively.

Toggle joints 68 and 70 are operably coupled with slides 52 and 54 respectively, the former of which includes a pair of links 72 and 74 interconnected by pivot pin 76. Toggle joint 70 on the other hand, includes a link 78 and a crank 80 that are pivotally interconnected by a pin 82. Pins 76 and 82 are in turn interconnected by a bar 84.

Links 72 and 78 are pivotally connected with hinge means 56 and 58 respectively, whereas links 74 and crank 80 are pivotally secured to the wall 10. The last-mentioned pivot means includes discs 86 and 88 for links 74 and crank 80 respectively. Bolt and nut means 90 and 92 releasably attach the discs 86 and 88 to the wall 10 and pivot pins 94 and 96 for link 74 and crank 80 are eccentrically disposed with respect to the axes of rotation of discs 86 and 88 respectively upon loosening of their corresponding bolt and nut means 90 and 92.

A solenoid or other power means 98 is carried by the wall 10 through the medium of a lateral shelf 100 on the latter. A rectilinearly reciprocable core 102 forming a part of the power means 98 is pivotally coupled with the crank 80 through the medium of a link 104. Crank 80 is yieldably biased toward one end of its path of travel by a spring 106 that connects crank 80 with a pin 108 on the wall 10.

Wall 10 also carries an L-shaped member 110 which is adapted to bear against the tube 20 between the slides 52 and 54 to vary the size of tube 20. Bolt and nut means 112 fastening the member 110 to the wall 10 may be loosened to permit adjustment of the member 110 as the bolt and nut means 112 shifts in a slot 114 formed in wall 10.

Operation

The pinch slide 54 under the force transmitted from spring 106, normally cuts off material flow through the tube 20 by compressing tube 20 closed as illustrated in Figs. 1 and 3.

It is to be noted that the outer end of slide 54 which engages the tube 20, substantially spans the distance between legs 32 of element 28 and compresses the tube 20 transversely thereof flatly against the bight or backing plate 30 forming a part of the element 28. Bight 30 cannot move laterally away from the slides 52 and 54 because of the hooked relationship between ears 44 and hooks 50 and the same relationship between hooks 34 and ledges 46.

Upon energization of solenoid 98 to retract its core 102 and thereby impart a pulling action upon the link 104, crank 80 swings upwardly about its pivot 96 to shift link 78 to the right as viewed in Fig. 1 and thereby retract the slide 54. At the same time, bar 84 is forced upwardly by the crank 80 to force link 72 to the left as viewed in Fig. 1, thereby shifting the slide 52 into engagement with the tube 20, closing the latter in the same manner as slide 54 is shown compressing tube 20 in Figs. 1 and 3. Thus, the joints 68 and 70 alternately move to positions in and out of alignment. As soon as the solenoid 98 is deenergized, spring 106 returns all parts to the position illustrated in Fig. 1.

Manifestly, the amount of material that is dispensed during each cycle of operation, depends upon the size of tube 20 between slides 52 and 54 and such size may, of course, be adjusted by loosening bolt and nut means 112 to permit reciprocation of member 110 relative to wall 10.

It is apparent also that the strokes of the slides 52 and 54 may be adjusted simply by loosening the bolt and nut means 90 and 92 whereby to permit rotation of the discs 86 and 88 and changing the positions of the pivot pins 94 and 96.

Tube 20 may be removed for replacement with new clean tubes simply by removing the element 28. This is accomplished by pressing inwardly upon the crossbar 42 which raises the hooks 34 out of engagement with the ledges 46, hooks 34 swinging upwardly through the opening 18. Thereupon, the entire element 28 may be swung outwardly to release ears 44 from their operative association with hooks 50.

Having thus described the invention what is claimed as new and desired to be secured by Letters Patent is:

1. In a metering device for dispensing a predetermined amount of material, a backing plate; a compressible tube extending along one face of said plate; a pair of spaced slides reciprocable alternately toward said plate for pinching the tube transversely thereof against the plate to cut off flow through the tube; a toggle joint pivotally connected with each slide respectively, each joint including a pair of links having a pin pivotally interconnecting said pair of links; a bar pivotally interconnecting the pins; and power means operably coupled with one of said pins for actuating the joints to reciprocate the slides the links of one joint being shiftable from a position of alignment to a position of angular intersection as said one joint is actuated, the links of the other joint being shiftable from a position of angular intersection to a position of alignment as said other joint is actuated.

2. In a metering device for dispensing a predetermined amount of material, a backing plate; a compressible tube extending along one face of said plate; a pair of spaced slides reciprocable alternately toward said plate for pinching the tube transversely thereof against the plate to cut off flow through the tube; a toggle joint pivotally connected with each slide respectively, each joint including a pair of links having a pin pivotally interconnecting said pair of links; a bar pivotally interconnecting the pins; and a swingable crank pivotally connected with the pin of one of said joints for actuating the joints to reciprocate the slides the links of one joint being shiftable from a position of alignment to a position of angular intersection as said one joint is actuated, the links of the other joint being shiftable from a position of angular intersection to a position of alignment as said other joint is actuated.

3. In a metering device for dispensing a predetermined amount of material, a backing plate; a compressible tube extending along one face of said plate; a pair of spaced slides reciprocable alternately toward said plate for pinching the tube transversely thereof against the plate to cut off flow through the tube; a toggle joint pivotally connected with each slide respectively, each joint including a pair of links have a pin pivotally interconnecting said pair of links; a bar pivotally interconnecting the pins; a swingable crank pivotally connected with the pin of one of said joints for actuating the joints to reciprocate the slides; and resilient means connected with said crank for yieldably biasing said crank at one end of its path of travel to hold one of said slides retracted and the other slide against the tube, the links of one joint being shiftable from a position of alignment to a position of angular intersection as said one joint is actuated, the links of the other joint being shiftable from a position of angular intersection to a position of alignment as said other joint is actuated.

4. In a metering device for dispensing a predetermined amount of material, a support; a backing plate spaced from the support; releasable means attaching the plate to the support; a compressible tube between the plate and the support; a pair of space slides carried by the support and reciprocable alternately toward said plate for pinching the tube transversely thereof against the plate to cut off flow through the tube; a toggle joint pivotally connected with each slide respectively, each joint including a pair of pivotally interconnected links; and a swingable crank pivotally connected with the pin of one of said joints for actuating the joints to reciprocate the slides, said crank and one of the links of the other joint each being provided with structure swingably securing said crank and said one link of said other joint respectively to the support, said structures being shiftable relative to the support for varying the strokes of the slides, the links of one joint being shiftable from a position of alignment to a position of angular intersection as said one joint is actuated, the links of the other joint being shiftable from a position of angular intersection to a position of alignment as said other joint is actuated.

References Cited in the file of this patent

UNITED STATES PATENTS

| | | |
|---|---|---|
| 1,810,772 | Lassen | June 16, 1931 |
| 2,387,923 | McBrien | Oct. 30, 1945 |
| 2,554,570 | Harvey | May 29, 1951 |
| 2,667,288 | Mach | Jan. 26, 1954 |
| 2,673,011 | Rood et al. | Mar. 23, 1954 |
| 2,718,856 | Gathercoal | Sept. 27, 1955 |
| 2,726,019 | Moran | Dec. 6, 1955 |